United States Patent
Becher et al.

(10) Patent No.: US 11,846,125 B2
(45) Date of Patent: Dec. 19, 2023

(54) LOCKING DEVICE FOR CAR DOORS

(71) Applicants: INTEVA FRANCE SAS, Sully sur Loire (FR); Marquardt GmbH, Rietheim-Weilheim (DE)

(72) Inventors: Andreas Becher, Villingen-Schwenningen-Obereschach (DE); Achim Mink, Deißlingen (DE); Oliver Huppenbauer, Villingen-Schewenningen (DE); Jean-Marc Belmond, Saint-Jean le Blanc (FR); Pascal Philippe, Saulcy/Meurthe (FR)

(73) Assignees: INTEVA FRANCE SAS, Sully sur Loire (FR); MARQUARDT GMBH, Rietheim-Weilheim (DE)

( * ) Notice: Subject to any disclaimer, the term of this patent is extended or adjusted under 35 U.S.C. 154(b) by 53 days.

(21) Appl. No.: 17/493,601

(22) Filed: Oct. 4, 2021

(65) Prior Publication Data
US 2022/0025682 A1    Jan. 27, 2022

Related U.S. Application Data

(63) Continuation of application No. PCT/IB2019/000366, filed on Apr. 2, 2019.

(51) Int. Cl.
| | | |
|---|---|---|
| E05B 81/78 | (2014.01) | |
| E05B 81/76 | (2014.01) | |
| G07C 9/00 | (2020.01) | |

(52) U.S. Cl.
CPC .............. *E05B 81/78* (2013.01); *E05B 81/77* (2013.01); *G07C 9/00309* (2013.01)

(58) Field of Classification Search
None
See application file for complete search history.

(56) References Cited

U.S. PATENT DOCUMENTS

| | | | |
|---|---|---|---|
| 9,514,587 B2 | 12/2016 | Kishita | |
| 10,062,224 B2 * | 8/2018 | Cojocaru | ........... G07C 9/00563 |

(Continued)

FOREIGN PATENT DOCUMENTS

| | | |
|---|---|---|
| CN | 107762330 A | 3/2018 |
| DE | 202011107862 U1 | 4/2012 |

(Continued)

OTHER PUBLICATIONS

International Search Report for International Application No. PCT/IB2019/000366; International Filing Date: Apr. 2, 2019; dated Jan. 2, 2020; 4 pages.

(Continued)

*Primary Examiner* — Carlos Garcia
(74) *Attorney, Agent, or Firm* — CANTOR COLBURN LLP

(57) ABSTRACT

The invention relates to a locking device for car doors, especially for car doors without door handles, having an electronic control unit for the authorization of access, which is connected to one or more sensors for a first operating step, i.e. a proximity sensor, a touch sensor etc. and/or an antenna for a wireless communication, i.e. a NFC (near field communication) antenna for NFC-communication with a smart device like a smart card, a mobile phone, a smart watch, a smart key, etc., and a driven mechanical lock/or unlock unit including a latching element for latching the closed door end position.

Figure 1:
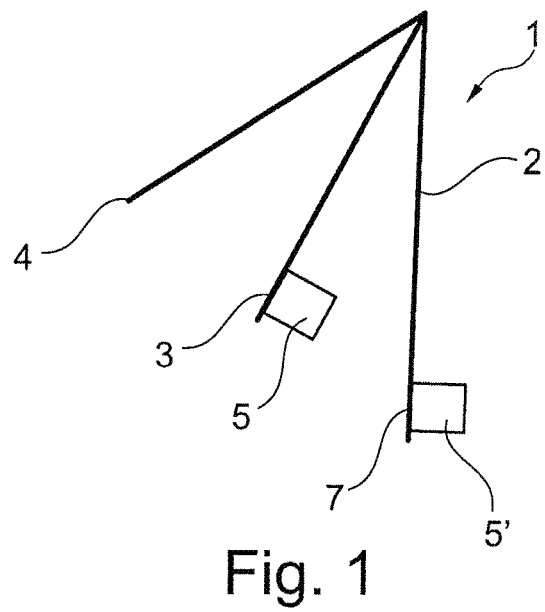

According to the invention, a latching element is provided to block an intermediate position 3 of the car door 1, wherein at least one sensor 5, 5' is accessible and/or active in the intermediate position 3 of the car door 1 for a second operating step and not accessible and/or not, active in the closed end position 2 of the car door.

17 Claims, 3 Drawing Sheets

(56) References Cited

U.S. PATENT DOCUMENTS

| | | | |
|---|---|---|---|
| 10,584,526 B2 | 3/2020 | Linden et al. | |
| 10,711,504 B2 | 7/2020 | Roos et al. | |
| 2003/0067394 A1* | 4/2003 | Tsui | E05F 15/43 340/5.71 |
| 2015/0339870 A1* | 11/2015 | Cojocaru | G07C 9/00563 340/5.53 |
| 2017/0292310 A1 | 10/2017 | Podkopayev | |
| 2018/0051502 A1 | 2/2018 | Roos et al. | |
| 2019/0024421 A1 | 1/2019 | Cumbo | |
| 2019/0277071 A1* | 9/2019 | Sabatini | B60Q 1/323 |

FOREIGN PATENT DOCUMENTS

| | | |
|---|---|---|
| DE | 112013005836 T5 | 8/2015 |
| DE | 202017104564 U1 | 10/2017 |
| DE | 102017214174 A1 | 2/2018 |
| DE | 102018005147 A1 | 1/2019 |

OTHER PUBLICATIONS

Written Opinion for International Application No. PCT/IB2019/000366; International Filing Date: Apr. 2, 2019; dated Jan. 2, 2020; 6 pages.
Communication pursuant to Article 94(3) EPC dated Oct. 17, 2023; EP Application No. 19726134.0; 5 pages.

\* cited by examiner

LOCKING DEVICE FOR CAR DOORS

CROSS REFERENCE TO RELATED APPLICATIONS

This application is a continuation application of PCT/IB2019/000366, filed on Apr. 2, 2019, the entire contents of which are incorporated by reference thereto.

The invention relates to a locking device for car doors according to the first part of claim 1.

Since some years the keyless access of cars is triggered by a sensor in a door handle, which the user has to touch to unlock the door. Therefore an electronic module with a touch sensor is integrated into the door handle, which has an electrical interface to an electronic control unit for access control to communicate the touch event to the electronic control unit for access control.

Furthermore movable car handles are known to build a flat outside surface of the car door in the locked door position.

An object of the present invention is to provide a locking device, which can be operated without any door handle.

Starting from a car locking system according to the first part of claim 1 this object is achieved by the characters of the characterizing part of claim 1.

According to the invention instead of a movable handle there is a latched intermediate position of the car door into which the door is moved depending on a correct access authorization. A latching element is provided to block the intermediate position of the car door, wherein at least one sensor is accessible and/or active in the intermediate position of the car door for a second operating step and not accessible and/or not active in the closed end position of the car door.

The intermediate position allows a user to grip behind the outside surface of the door, i.e. into a gap between the door and the car body. Since this intermediate position is latched, it is a safe position. The car door cannot push against obstacles like other cars, walls, etc., if there is not enough space to open the door.

Accidents for example collisions with passing cyclist are prevented because the car door cannot open surprisingly, but is latched in the intermediate position.

In the intermediate position the second operating step can be initiated by an authorized person. Then any person can grip through the gap between the door and the car body to operate the sensor.

Preferably the sensor is connected to a control unit to execute the second operating step. For example the final opening of the car door into the open end position can be the second operating step or part of the second operating step. Then the control unit is adopted to unlatch the intermediate position.

In this case the sensor is operated to unlatch the intermediate position. Then the authorized person can bring the car door into the open end position i.e. by manually pulling, pushing a drive button, etc.

The control unit can also be adopted to initiate the further movement of the door into the open end position in the second operating step. Such an automatic opening increases the comfort for the car user.

For enhancement of the invention the control unit can be adopted to execute a second access authorization check i.e. with a finger print sensor etc. in the second operating step. Such a double authorization increases the security of the car and prevents the unauthorized use of the car.

Advantageously the sensor or the sensors for the second step operation are protected against influences of the outer environment of the car in the closed end position of the car door. First of all this can be achieved by the location of the sensor or the sensors in the area of the narrow side of the car door or the proximate car column, which is not accessible when the car door is closed.

The sensor protection can be improved when then sensor or the sensors are sealed against the outer environment in the closed door position. This is possible without a separate sealing by an appropriate sensor location using the regular door sealing.

When the car has no handles driving means for the movement of the car door from the closed end position into the intermediate position are expedient. To increase the comfort driving means are also expedient for the movement of the car door from the intermediate position to the open end position and/or for the closing movement starting from the open end position.

In an enhancement of the invention there are driving means and a control unit to move the car door from the intermediate position into the closed end position. This is important in the situation when there is no further operation of the car door in the intermediate position. Closing again in this case can be controlled dependent on defined closing criteria.

Such a criteria can be a time interval without manually door movement, a detection of a disappearing proximity signal, an operation of a close sensor, a closing signal via NFC-communication, etc.

Preferably this movement is controlled by a control unit dependent on the defined closing criteria.

The driving means for one or more of the described door movements can be a motor, especially an electric motor, a spring, an air bottle etc.

Advantageously a control unit controls a signal light to generate a light signal for indication of the intermediate position of the car door and/or illumination of the sensor position to facilitate the operating of the sensor or the sensors.

An embodiment of the invention is shown in the drawings.

In detail show

Figure 2:
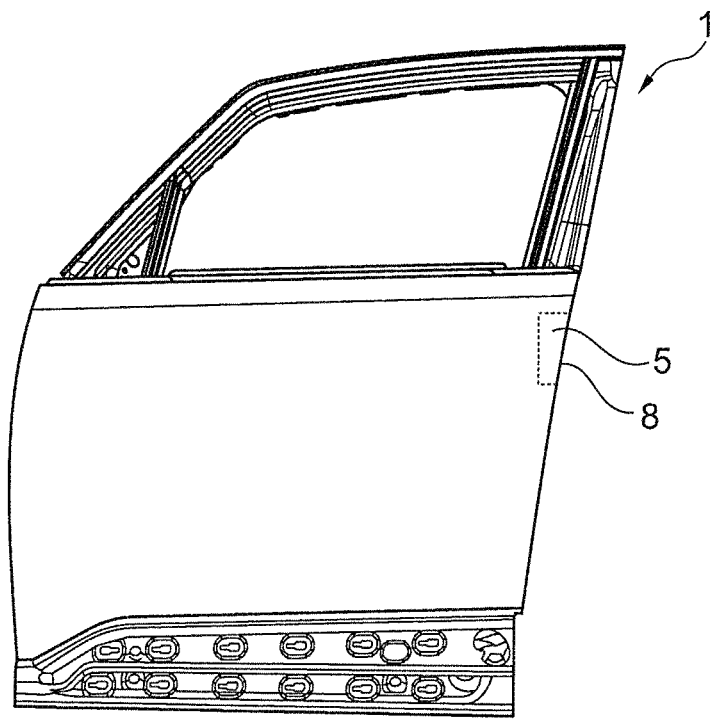
Figure 3:
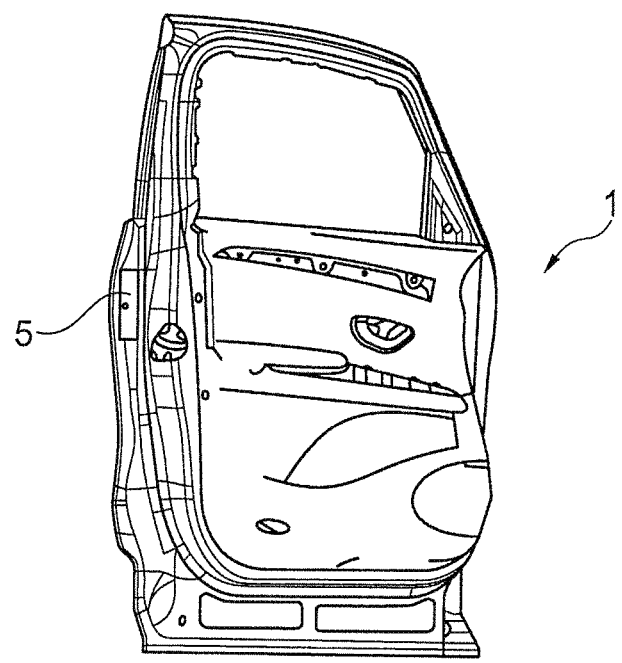
Figure 4:
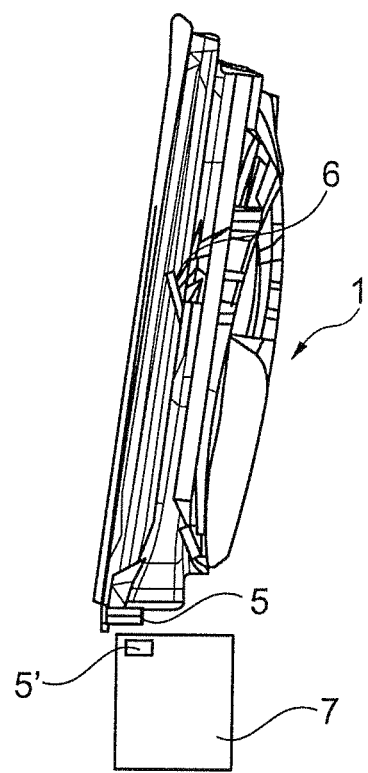

FIG. 1 a schematic illustration of three different door positions,

FIG. 2 a side view to the outer side of the car door,

FIG. 3 perspective illustration of the inner side of the car door,

FIG. 4 perspective illustration of the narrow side of the car door and

Figure 5:
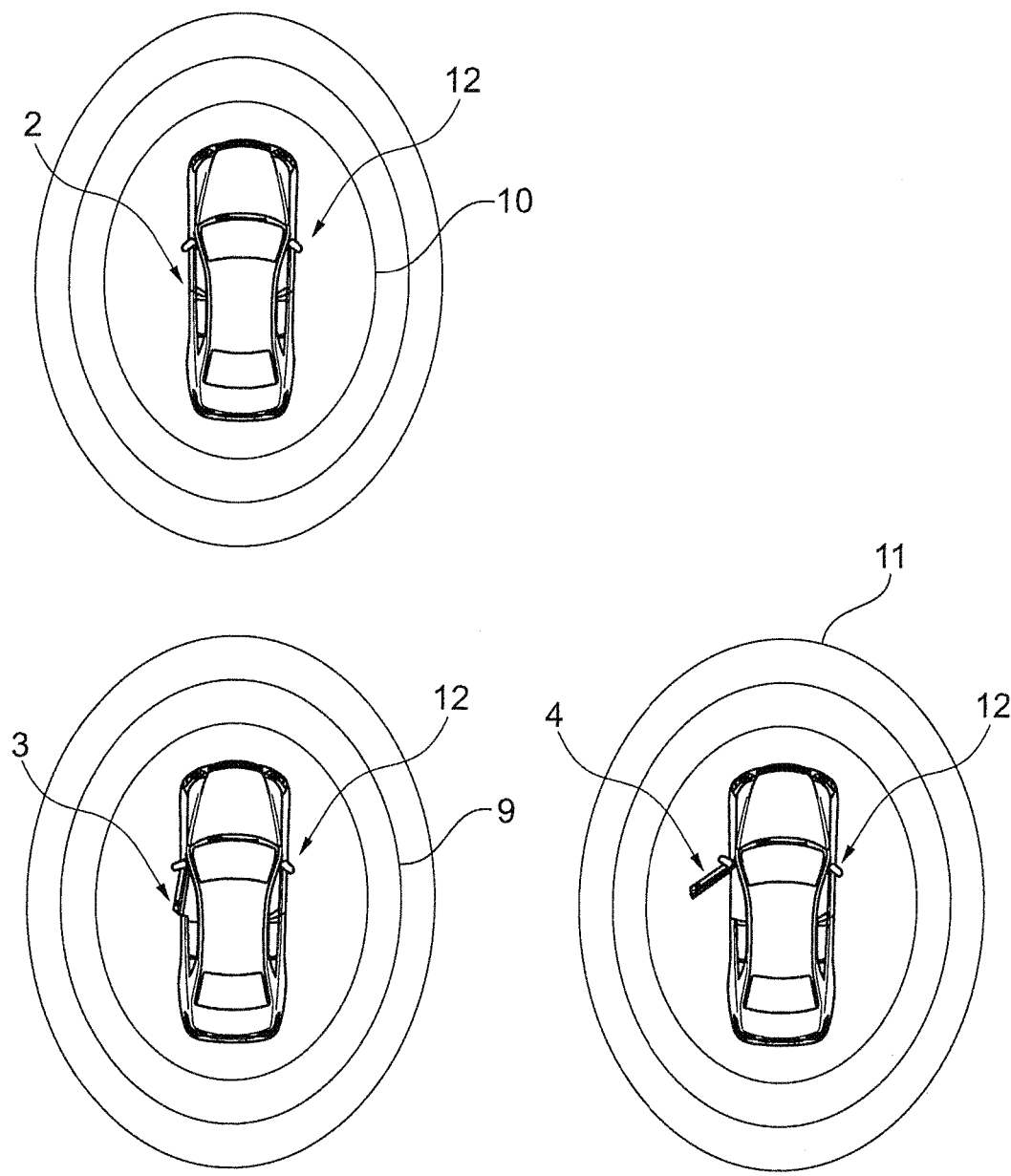

FIG. 5 an illustration of the different door positions inside different proximity zones.

The car door 1 in FIG. 1 is shown in three positions 2, 3, 4, the closed end position 2, the intermediate position 3 and the open end position 4. A sensor 5 is located in the narrow side 6 of the car door 1 covered by the car door 1 in the closed position 2.

As can be seen in FIG. 1 and FIG. 4 the sensor 5 is arranged proximate to the B-column 7 of the car body in the door. Alternatively or in combination with the door sensor 5 a sensor 5' could be arranged in the B-column 7 of the car body.

When the door 1 is in the closed position 2, the sensor 5 is not accessible and covered by the door. After authorization in a second operating step of the locking device for example using a proximity sensor or a NFC-communication the control unit of the locking device opens the door into the intermediate position 3.

Now the sensor 5 and/or the sensor 5' is accessible for a person who can grip around the back edge 8 of the door 1. The sensor 5 can be operated for example by touching or nearing and consequently the control unit will execute the second operating step. This includes the unlatching of the intermediate position 3 and so the person can pull the door at the back edge 8 into the open end position 4.

Alternatively this position can reached by driven movement in an automatic embodiment.

The second operating step may also include a second authorization i.e. a finger print scanner can be arranged as sensor 5 or joined to the sensor 5 for identification of the car user. In this embodiment the authorization of access is realized as two step authorization and the safety of the access routine is improved.

In the embodiment shown in FIG. 5 the access authorization is made by an authorization device like a key or a smartphone or a smartcard, etc. A keyless entry is possible i.e. using a proximity sensor detecting and identifying such an authorized device. In this case the different door positions 2, 3, 4 can be associated to different, preferably configurable distances as shown in FIG. 5.

For example in the middle distance 9 the intermediate position 3 can be activated and in the near distance 10 the movement into the open end position 4 can be started. This movement can then be stopped by the user near by the door. On the other hand the movement from the open end position 4 or from the intermediate position 3 into the closed end position 2 can be started when the authorizing device or person is leaving the car 12, especially the spaced distance 11. This distance can also be a welcome distance in which the car gives signals when the user is nearing to the car 12.

1 car door
2 closed end position
3 intermediate position
4 open end position
5 sensor
5' sensor
6 narrow side
7 B-column
8 back edge
9 middle distance
10 near distance
11 spaced distance
12 car

The invention claimed is:

1. A locking device for car doors without door handles, comprising:
   an electronic control unit for authorization of access, the electronic control unit is connected to one or more sensors for a first operating step and/or an antenna for a wireless communication with a smart device; and
   a driven mechanical lock/or unlock unit including a latching element for latching a closed end position of a car door wherein the latching element is provided to block an intermediate position of the car door, wherein different door positions can be associated to different distances, and wherein at least one sensor is accessible and/or active in an intermediate position of the car door for a second operating step and not accessible and/or not active in the closed end position of the car door, wherein the at least one sensor is a touch sensor that is only actuatable when the car door is in the intermediate position.

2. The locking device according to claim 1, wherein the intermediate position of the car door enables a grip through a gap between the car door and a car body and an activation of the touch sensor for the second operating step.

3. The locking device according to claim 1, wherein the intermediate position of the car door activates the touch sensor for generating an appearing proximity signal to allow the second operating step.

4. The locking device according to claim 1, wherein the touch sensor for the second operation step is sealed against influences of an outer environment of the car in the closed end position of the car door.

5. The locking device as in claim 1, wherein the one or more sensors are at least one of the following: a proximity sensor, a touch sensor and the smart device is at least one of the following: a smart card, a mobile phone, a smart watch, and a smart key and the different distances are configurable.

6. The locking device as in claim 1, wherein the antenna is a near field communication antenna.

7. The locking device according to claim 1, wherein a control unit is provided to unlatch the intermediate position of the car door in the second operating step and/or to initiate further movement of the car door into an open end position in the second operating step.

8. The locking device according to claim 7, wherein the control unit executes a second access authorization check in the second operating step.

9. The locking device according to claim 7, wherein a driving is provided for movement of the car door from the intermediate position and/or the open end position into the closed end position.

10. The locking device according claim 7, wherein a driving means is provided for the movement of the car door from the intermediate position into the open end position.

11. The locking device as in claim 10, wherein the driving means is at least one of the following: a motor, a spring, and an air bottle.

12. The locking device according to claim 1, wherein a driving means is provided for movement of the car door from the closed end position into the intermediate position.

13. The locking device as in claim 12, wherein the driving means is at least one of the following: a motor, a spring, and an air bottle.

14. The locking device according to claim 1, wherein the electronic control unit is adopted to move the car door from the intermediate position into the closed end position dependent on a time interval without a second operating step sensor operation.

15. The locking device according to claim 14, wherein the electronic control unit is adopted to move the car door from the intermediate position into the closed end position dependent on a time interval without movement the car door and/or dependent on a detection of a disappearing proximity signal.

16. The locking device according to claim 1, wherein a control unit controls a signal light to generate a light signal for indication of the intermediate position of the car door.

17. The locking device according to claim 16, wherein the signal light is arranged to illuminate the touch sensor for the second operating step.

\* \* \* \* \*